United States Patent [19]

Forster et al.

[11] Patent Number: 5,048,434
[45] Date of Patent: Sep. 17, 1991

[54] APPARATUS FOR TRANSPLANTING PLANTS

[76] Inventors: Albert J. Forster, 19420 Wooster Rd., Howard, Ohio 43028; James J. Zeller, 6934 Simmons Church Rd., Centerburg, Ohio 43011

[21] Appl. No.: 513,125

[22] Filed: Apr. 23, 1990

[51] Int. Cl.⁵ ............................................. A01C 1/04
[52] U.S. Cl. .................................. 111/105; 111/104; 47/901
[58] Field of Search ...................... 111/104, 105, 100; 47/74, 87, 901, 86

[56] References Cited

U.S. PATENT DOCUMENTS

| | | | |
|---|---|---|---|
| 2,771,709 | 11/1956 | Ritter | 47/1 |
| 3,799,078 | 3/1974 | Blackmore et al. | 111/2 |
| 3,820,480 | 6/1974 | Blackmore et al. | 111/2 |
| 3,973,355 | 8/1976 | McKenzie | 47/37 |
| 4,028,847 | 6/1977 | Davis et al. | 47/65 |
| 4,130,072 | 12/1978 | Dedolph | 111/100 |
| 4,167,911 | 9/1979 | Masuda et al. | 111/105 |
| 4,196,543 | 4/1980 | Dedolph | 47/5.5 |
| 4,213,273 | 7/1980 | Dedolph | 47/74 |
| 4,215,513 | 8/1980 | Dedolph | 47/56 |
| 4,278,625 | 7/1981 | Dedolph | 264/39 |
| 4,307,827 | 12/1981 | Turunen | 111/104 |
| 4,408,549 | 10/1983 | Qvarnstrom | 111/2 |
| 4,947,579 | 8/1990 | Harrison et al. | 111/105 |
| 4,947,582 | 8/1990 | Visser | 111/104 |

*Primary Examiner*—Dennis L. Taylor
*Assistant Examiner*—Spencer Warnick
*Attorney, Agent, or Firm*—John L. Gray

[57] ABSTRACT

The present invention involves a method and an apparatus which utilizes a porous open cell structure in which seeds may germinate and plants root and be provided with appropriate nutrients and water until they are mature enough to be transplanted. At that time the entire porous open cell structure, which is in the form of a flat, may be cut into individual units, each individual unit containing one or more plants centered therein. Thus the separated individual units may then be transplanted into various receptacles including conventional individual plastic flats which are in the condition found in most greenhouses and purchased by individual buyers.

4 Claims, 4 Drawing Sheets

APPARATUS FOR TRANSPLANTING PLANTS

BACKGROUND OF THE INVENTION

At most greenhouses today transplanting is done by hand. As a consequence, plants need to be grown fairly large to accommodate manual transplanting and young plants with fine roots tend to loose the root medium around the roots when manually handled and this is also a very time consuming and labor intensive activity. In those situations where there have been attempts to use a machine to transplant young plants, such as seedlings, into a tray for display and sale, the existing equipment does not pick up all the plants but leaves some in the seedling tray, it cannot replace the missing plants and consequently plants the finished container without some plants. Moreover, it does not firm the plant into the receiving container. Sometimes a seedling plug is dropped while enroute to the larger receiving container and the present equipment is limited as to types of containers into which the plants may be introduced. Additional labor is needed to inspect and place plants into the cells that have been missed. The equipment available today goes out of adjustment easily and is costly to repair.

The present invention overcomes these disadvantages by being able to transplant plants at a younger age because the root ball acts as a carrier. The root ball will not disintegrate with mechanical manipulation because it is in an open cell structure capable of withstanding movement. The entire operation is computer controlled so that efficiencies of time are realized.

SUMMARY OF THE INVENTION

The present invention involves a method and an apparatus which utilizes a porous open cell structure in which either seeds may germinate or plants rooted while provided with appropriate nutrients and water until they are mature enough to be transplanted. At that time the entire porous open cell structure, which is in the form of a flat, may be cut into individual units, each individual unit containing one seedling or plant centered therein. Thus the separated individual units may then be transplanted into various receptacles including conventional individual plastic flats which are in the condition found in most greenhouses and purchased by individual buyers.

It is therefore an object of this invention to provide a method and apparatus for separating individual seedlings or plants from a common bed in which they have been grown.

It is another object of this invention to transfer such plants in their growth environment into conventional individual flat containers in which they may be displayed and sold to the public.

It is a further object of this invention to accomplish such separation and transplanting with a maximum of efficiency and the elimination of any units in which plants have not been established.

These, together with other objects and advantages of the invention will become more readily apparent to those skilled in the art when the following general statements and descriptions are read in the light of the appended drawings.

DETAILED DESCRIPTION OF THE INVENTION

Figure 1:
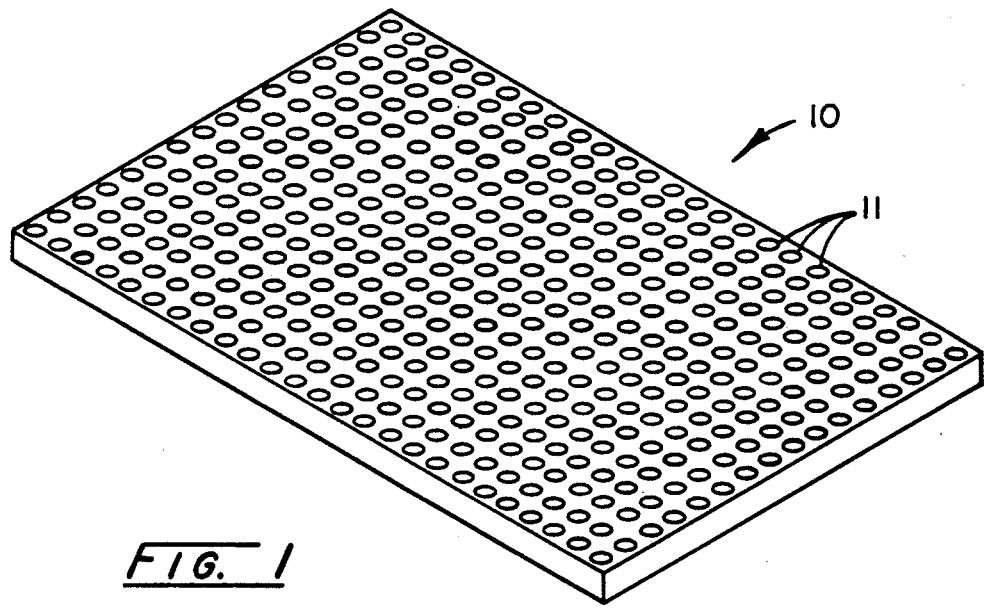
FIG. 1 is a perspective view of the porous open cell unitary flat which is used to house the individual seeds or plants and appropriate nutrients and water.

Referring now more particularly to FIG. 1, the porous open cell unitary flat is shown generally at 10 and comprises a number of small receptacles which have been placed in the flat merely by pressing downward into the material of the flat. The holes 11—11 should be tapered so a germination medium can be easily placed into the cells. The cell hole 11 should have the largest diameter at the surface tapered down to the narrowest diameter at the bottom. The germinating medium should not be placed even with the top of the cell, but it should be recessed and tapered to allow the seed to drop near the center of the cell. The seed germinating medium may be anything that will support seed germination and plant growth through all stages of growth. There are many commercial and seed germination mixes available for this purpose. Most commercial peat suppliers which sell professional growing mixes usually have plug mixes available. Companies that supply these mixes include Fisson, Baccto, Grace, Ball, Vaughn's, and Michigan Peat. These mixes provide moisture content, water holding capacity, aeration, drainage, PH of 5.8 to 6.8, soluble salts, nutrient levels, and a high buffering capacity to the plant. When the porous open cell unitary flat 10 has been prepared with the individual cells 11—11 and filled with the germination growing medium described above, the porous open cell unitary flat 10 then can be sown with seeds. It is best to use a commercially available seeder to sow seeds into these flats. Among such seeders are "The Hamilton", "The Blackmore", "The Niagara", and "The Vandana". They all use a vacuum to pick up a seed and place it into the cell. The mechanism varies greatly on how this is done.

The porous open cell unitary flat 10 is not restricted to a specific size. As a consequence, most types of seeders can be utilized. Some seed, depending upon its particular needs, may need to be covered with additional medium. To do this, usually a fine vermiculite can be used as a thin covering over the seed.

In addition to using seeds, cuttings may also be propagated by sticking a cut end of plant material into the opening 11. The medium provides an environment around the cut conducive to root development. The technique used in propagation varies with the type of plant being propagated and the experience of the propagator. Heat, moisture, air circulation, light and plant density must be consistently monitored to achieve success with rooting cuttings.

Figure 2:
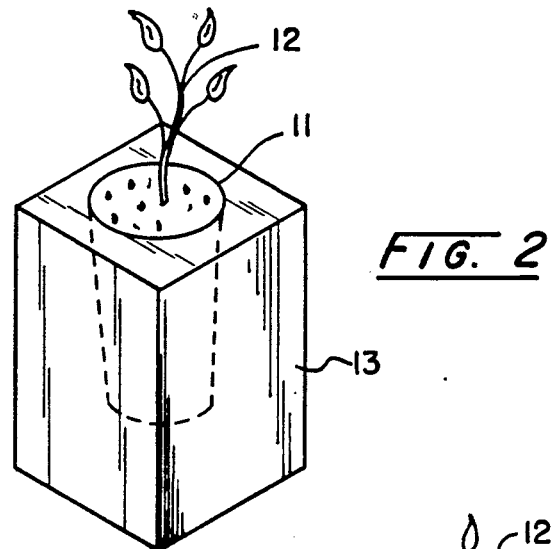
FIG. 2 shows such a plant which has developed from one of the depressions shown in FIG. 1 after it has been separated from the porous open cell unitary flat shown in FIG. 1.
Figure 3:
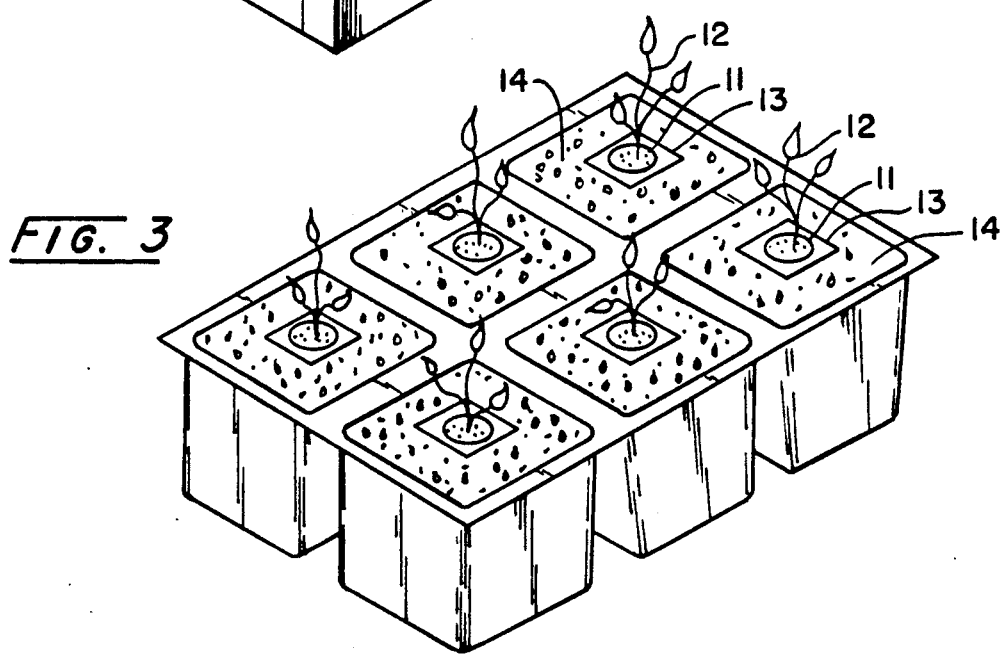
FIG. 3 shows the plant of FIG. 2 which has been impressed into the growing medium which has previously had a small depression made therein in each receptacle, for example, in a conventional plastic flat which is sold in a greenhouse.

Regardless of the technique that is used, once the plant in the hole 11 has grown to an appropriate stage of maturation, it is desirable to cut the porous open cell unitary flat 10 into cubes with the plants 12 surrounded in the unit 13 as shown in FIG. 2. Thereafter, the entire unit 13 is installed in conventional separate receptacles 14—14 as shown in FIG. 3. To accomplish this the apparatus shown in FIG. 4 is utilized.

Figure 4:
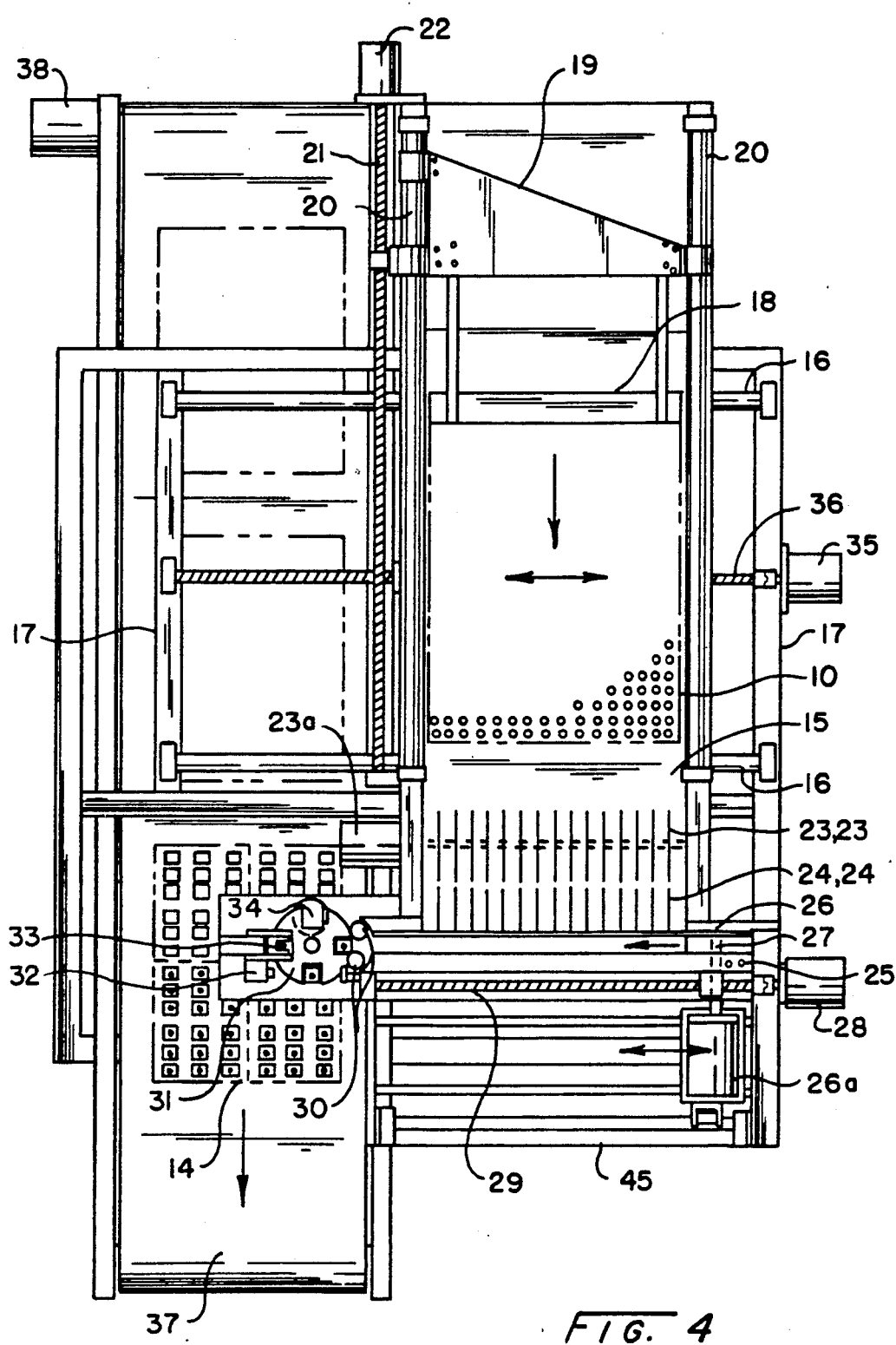
FIG. 4 is a plan view of the apparatus constituting a portion of this invention which is utilized to accomplish the separation and transplanting of the plants as shown in FIGS. 1, 2, and 3.

Referring now more particularly to FIG. 4, the porous open cell unitary flat 10 is shown supported on a table 15 which rests on rollers 16—16 which in turn are supported on a framework 17—17. The porous open cell unitary flat 10 is moved in increments by means of the pushbar 18 attached to the supports 19—19 which in turn are supported on rods 20—20. The pushbar 18 is moved in increments as a result of the screw 21 which is advanced by the stepping motor 22. As the porous open cell unitary flat 10 is propelled forward the revolving saw blades 2313 23 cut slots into the porous open cell unitary flat 10 to separate individual cells 11—11. These then are guided by a plurality of fins 24—24 which fit into the spaces occupied by the kerf left by the saw blades 23—23, said saw blades 23—23 being driven by motor 23a. The porous open cell unitary flat 10 is pushed against the fence 25 and at this point crosscut saw blade 26, driven by motor 26a and moved by air cylinder 45, cuts all across the width of the previously cut sections from the porous open cell unitary flat 10 thus producing the individual units 13—13 shown in FIG. 2. The individual units 13—13 then are pushed to the left shown in FIG. 4 by means of the fence pusher 27 which is moved by means of the stepping motor 28 and screw 29. The individual units 13—13 are pushed past the two rotary insertors 30—30 which are continuously driven by a motor (see FIG. 7) and inserted into the separator insertor 31. As shown, this separator insertor 31 has slots located at 90° intervals but this can be readily varied depending upon the particular size of the individual units 13—13 that are being transplanted. The separator insertor 31 rotates in a clockwise direction and the sensor 32 determines whether or not a plant is actually growing in the individual unit 13. If such an individual unit 13 has a plant growing in it when it reaches the insertor 33 it is then inserted into the soil of one of the units 14 in a conventional tray as will be described in greater detail in connection with FIG. 5. If there is no plant 12 in the individual cell 13, it steps one step further and is ejected into the chute 34. As the separator insertor 31 steps, and the inserted 33 inserts, the entire assembly is moved sidewise while riding on the roller 16—16 by means of the stepping motor 35 and the screw 36 so that each of the individual units 13—13 are inserted into the appropriate soil portion 14 of the associated flat which is carried on a conveyor 37 driven by a stepping motor 38.

Figure 5:
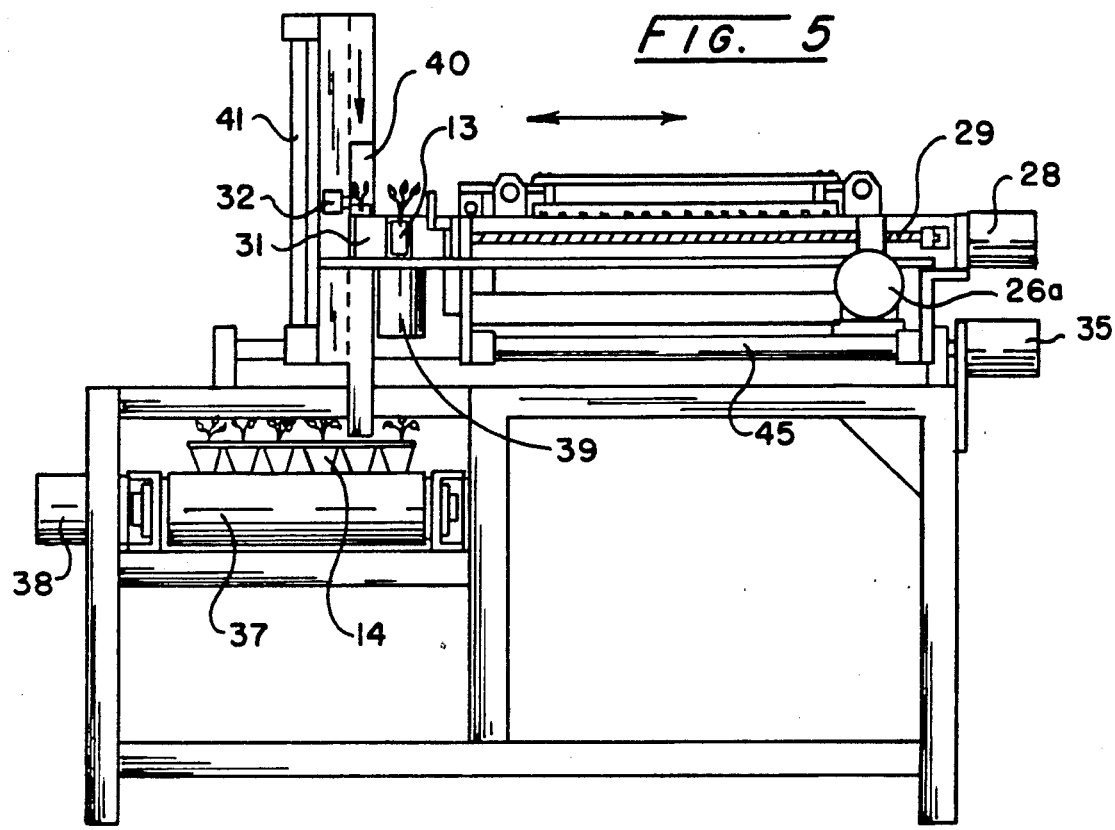
FIG. 5 is a front elevation view of the apparatus shown in FIG. 4.

Referring now more particularly to FIG. 5, it will be seen that the separator insertor 31 is driven by stepping motor 39. The individual units 13—13 are forced down into the predibbled holes in the growing medium 14 of the associated flat by means of the injector 40 which surrounds the seedling and is pressed against the individual units 13—13 around the periphery so that the plant is not damaged. Injector 40 is operated by means of air cylinder 41 which has appropriate upper and lower limit switches associated therewith, as also do all of the stepping motors.

Figure 6:
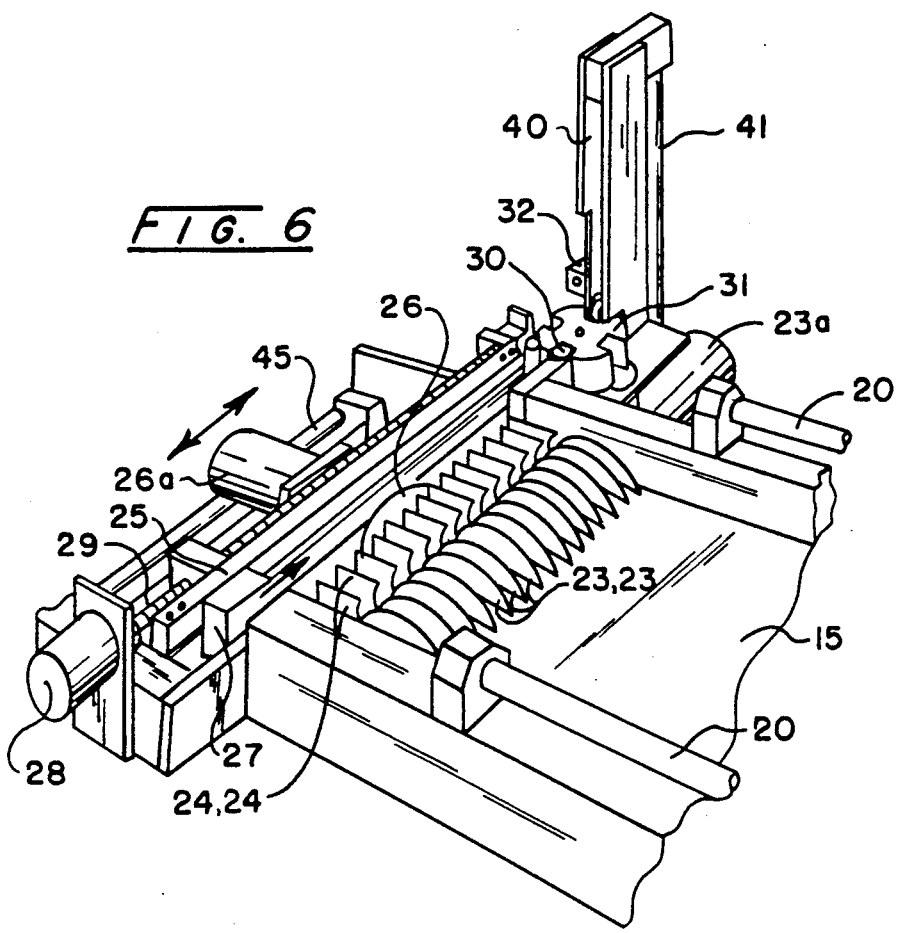
FIG. 6 is a perspective view of one section of the apparatus shown in FIGS. 4 and 5.

Referring now more particularly to FIG. 6, which is a perspective view of this portion of the apparatus, the manner in which the device operates may be more readily seen.

Figure 7:
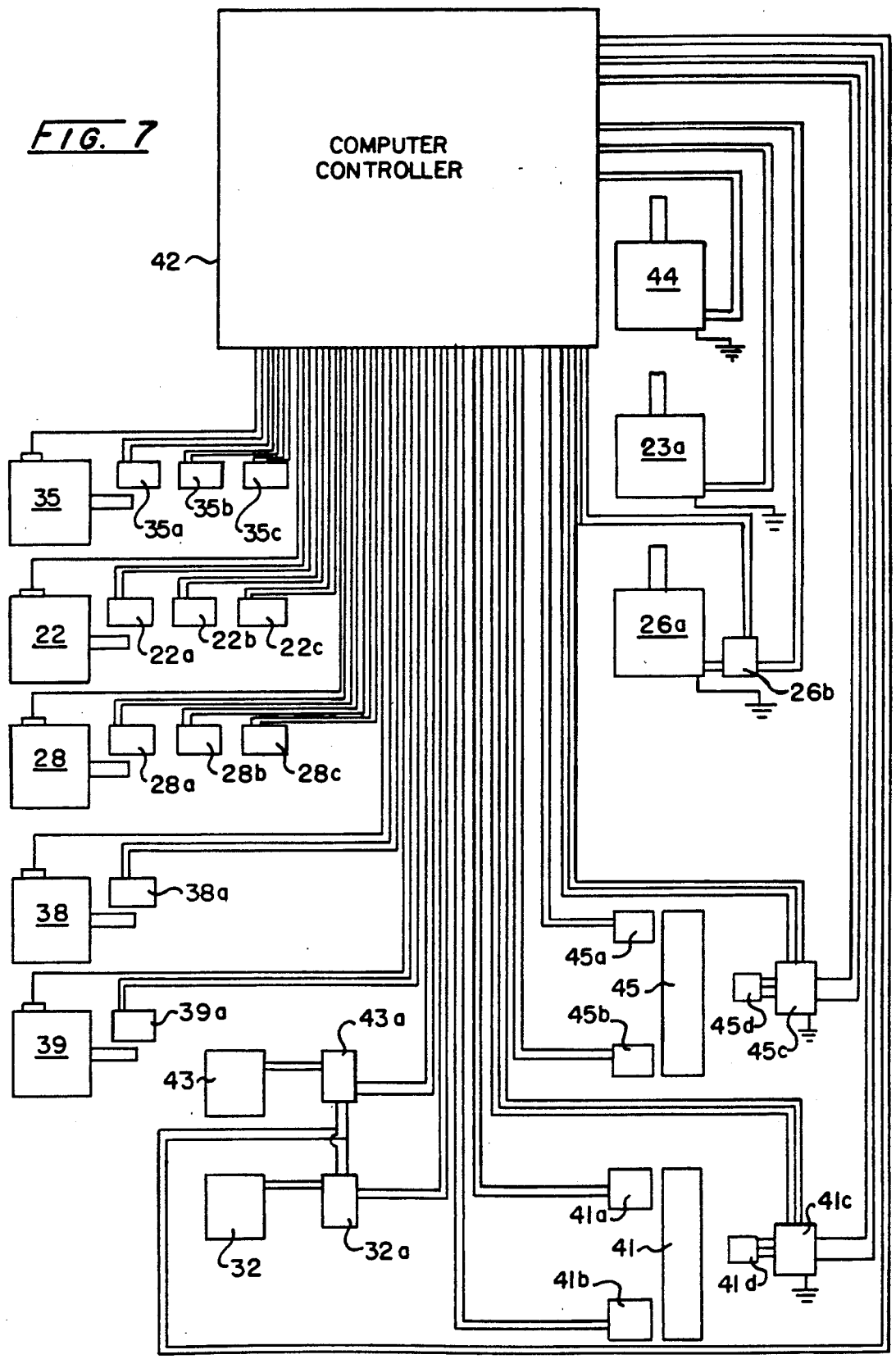
FIG. 7 is a diagrammatic display of the computer controller which is utilized to control the mechanisms shown in FIGS. 4, 5, and 6.

Referring now more particularly to FIG. 7, there is a basic computer controller 42 programmed to control the entire operation of this apparatus. On the left of FIG. 7 the various stepping motors are shown. The home limit switches 35b, 22b, 28b and 39a are all used for realignment at the start-up of the device. Stepping motor 35 is used to move the entire assembly sidewise. 35a indicates the counter clockwise limit switch associated thereto, 35b the home limit switch, and 35c the clockwise limit switch. Stepping motor 22 which is used to advance or retract the pushbar 18 also has the same limit switches, 22a being a counterclockwise limit switch, 22b being a home limit switch, and 22c being the clockwise limit switch. Stepping motor 28 which in conjunction with screw 29 operates the fence pusher also has associated therewith counterclockwise limit switch 28a, home limit switch 28b, and clockwise limit switch 28c. Stepping motor 38 which is used to move the conveyor is provided with a counter 38a. Stepping motor 39 which is used to operate the separator insertor is provided with a home limit switch 39a. The sensor 32 which detects whether or not a plant is actually growing in the individual unit 13 is provided with an on/off switch 32a. The apparatus is provided with a sensor 43, which is not otherwise shown, which is used to line up the first dibble hole in the first unit 14 in the flat to be filled and is also provided with an on/off switch 43a. As mentioned previously the rotary insertors 30—30 are continuously rotated by a motor not previously shown. This is motor 44 which is shown in FIG. 7. The motor 23a which continuously rotates the blades 23—23 is shown in FIG. 7. The motor 26a which operates the crosscut blade 26 is shown and is provided with an on/off switch 26b. Air cylinder 45 is used to move crosscut blade 26 and its operating motor 26a backwards and forwards across the table. It is provided with upper limit switch 45a and lower limit switch 45b, as well as an on/off switch 45c and a control valve 45d. Air cylinder 41, which operates injector 40, has upper limit switch 41a, lower limit switch 41b, on/off switch 41c and control valve 41d.

Thus it will be seen that the device of applicant may be used with a variety of different sizes of open cell unitary flats and the units 13—13 cut from the flat with the seedlings may be installed in a variety of receptacles although, of course, the great majority of the time flats such as 14 are used. By controlling all of the steps automatically, i.e. slicing the open cell unitary flat 10, crosscutting off the individual units 13—13, pushing them into the separator insertor 31, rejecting any that do not have plants growing therein, and controlling all this by means of a central computer controller, significant economies are achieved and virtually all labor is eliminated from this process. Furthermore, the receptacles that are filled with the seedlings do not have any empty spaces and the system can be adjusted for a variety of different size plants as desired.

While this invention has been described in its preferred embodiment, it is to be appreciated that variations therefrom may be made without departing from the true scope and spirit of the invention.

What is claimed is:

1. An apparatus for separating and transplanting plants in individual receptacles contained in a porous open cell unitary flat comprising:

a support for said flat, means for moving said flat intermittently on said support, means for cutting said flat into individual units, each unit surrounding an individual receptacle, said means for cutting said flat into individual units comprising a plurality of cutting means to make a first parallel cut in said flat and a second means for cutting said flat at right angles to said first cut so as to separate each unit from the other, means for inserting said individual units, each containing a plant, into a growing medium in an appropriate receptacle.

2. The apparatus of claim 1 wherein the means for inserting said individual units includes means for inserting said individual units, each containing a plant, into the growing medium in individual containers, with said individual containers, if desired, being assembled together.

3. The apparatus of claim 1 wherein the means for inserting said individual units includes means for detecting whether or not each unit contains a plant.

4. The apparatus of claim 3 wherein the means for inserting said individual units provides means for rejecting an individual unit which does not contain a plant, so that said individual unit not containing a plant is not inserted into the growing medium in an appropriate receptacle.

* * * * *

UNITED STATES PATENT AND TRADEMARK OFFICE
CERTIFICATE OF CORRECTION

PATENT NO. : 5,048,434

DATED : September 17, 1991

INVENTOR(S) : Albert J. Forster, et al

It is certified that error appears in the above-identified patent and that said Letters Patent is hereby corrected as shown below:

Column 3, line 28, the figures "2313 23" should be changed to read "23-23".

Signed and Sealed this

Twenty-second Day of December, 1992

Attest:

DOUGLAS B. COMER

*Attesting Officer*     Acting Commissioner of Patents and Trademarks